United States Patent
Chien et al.

(10) Patent No.: US 7,949,645 B2
(45) Date of Patent: *May 24, 2011

(54) CONTROL METHOD FOR MODIFYING ENGINEERING INFORMATION FROM A REMOTE WORK SITE AND A SYSTEM OF THE SAME

(75) Inventors: Jung-Mao Chien, Tao Yuan (TW); Jenn-Sheng Wu, Hsin Chu (TW); Ming-Hsiung Chang, Hsin Chu (TW); Mei-Hui Chen, Tai Chung Hsien (TW)

(73) Assignee: Industrial Technology Research Institute, Hsinchu County (TW)

( * ) Notice: Subject to any disclaimer, the term of this patent is extended or adjusted under 35 U.S.C. 154(b) by 189 days.

This patent is subject to a terminal disclaimer.

(21) Appl. No.: 12/362,685

(22) Filed: Jan. 30, 2009

(65) Prior Publication Data

US 2009/0138571 A1 May 28, 2009

Related U.S. Application Data

(63) Continuation of application No. 11/298,662, filed on Dec. 12, 2005, now Pat. No. 7,756,883.

(51) Int. Cl.
*G06F 17/30* (2006.01)
(52) U.S. Cl. ........ 707/706; 707/707; 707/708; 707/785; 707/770
(58) Field of Classification Search ..................... None
See application file for complete search history.

(56) References Cited

U.S. PATENT DOCUMENTS

| 7,062,514 | B2 | 6/2006 | Harris | |
|---|---|---|---|---|
| 2006/0010024 | A1 | 1/2006 | Eguchi | |
| 2006/0164682 | A1* | 7/2006 | Lev | 358/1.15 |
| 2006/0271477 | A1 | 11/2006 | Allin et al. | |
| 2007/0112788 | A1* | 5/2007 | Kobza et al. | 707/10 |
| 2007/0294617 | A1 | 12/2007 | Kroeger | |
| 2010/0149322 | A1* | 6/2010 | Lev | 348/61 |

FOREIGN PATENT DOCUMENTS

| TW | 580633 | 3/2004 |
|---|---|---|
| TW | 591463 | 6/2004 |
| TW | 595214 | 6/2004 |

* cited by examiner

*Primary Examiner* — Baoquoc N To
(74) *Attorney, Agent, or Firm* — Rabin & Berdo, P.C.

(57) ABSTRACT

A control method for modifying information concerning a remote work site includes: (i) setting up a database that comprises information concerning a remote work site; (ii) using an electronic device that has an image-capturing unit, in order to capture images of equipment or construction sites at the remote work site; (iii) communicating with an access platform and an option menu arranged on the access platform via an Internet connected module, creating an issue in a network database via the electronic device with an Internet browser and accessing information about the issue via the option menu that allows access to the database according to an authority level of a user; or creating an issue directly on a network database via an network connected module; and (iv) modifying the information in accordance with the issue of the images from the remote work site.

14 Claims, 2 Drawing Sheets

CONTROL METHOD FOR MODIFYING ENGINEERING INFORMATION FROM A REMOTE WORK SITE AND A SYSTEM OF THE SAME

CROSS-REFERENCE TO RELATED APPLICATIONS

This application is a continual application of co-pending application Ser. No. 11/298,662, filed on Dec. 12, 2005, the entire disclosure of which is incorporated herein by reference.

BACKGROUND OF THE INVENTION

1. Site of the Invention

The present invention relates to a control method for modifying engineering information from a remote work site and a system of the same, and in particular a control method for modifying engineering information from a remote work site and a system of the same that shortens work times and reduces costs.

2. Background of the Invention

Working in a remote place or being away from a work place causes many issues to arise. When this happens, often the person most qualified to advise upon or solve the issues is not where the issue has occurred, so questions cannot be answered quickly. This is particularly true in the case of engineering projects, often the construction manager, key planner, or architect is needed to solve an issue.

Furthermore, paper records about modifications are the standard method by which modifications are tracked. However, mistakes or the misplacement of these papers cause further errors to occur and increase a project's working time. Such issues only become more problematic when an issue cannot be solved immediately. What's more, after a project is completed, substantial parts of the plans, such as the drawings or engineering data, are often different from those of the original specifications. Naturally, this affects the quality of the project and slows down its completion.

Likewise, in a factory, if a piece of equipment is broken and needs to be fixed, labor hours will be wasted, efficiency will be reduced, and costs will be increased.

If there was a way for, as examples, construction managers, architects or repairmen, to offer feedback, answer questions and tell others the appropriate course of action to take immediately and easily, this would reduce the amount of time lost and ensure that, again as an example, the actual construction and the original construction plans more accurately resembled each other, or that a piece of broken machinery on a production line could be repaired quickly. Such a method would obviously be of great benefit to many people, organizations and companies, saving them both money and time.

With respect to Taiwan Patent 580633, titled "Method for revising specifications and system of the same", and Taiwan Patent 591463, titled "System for controlling projects and method of the same", both of these prior arts disclose a central control unit, a documentation-managing unit, and an Internet browser connecting with a documentation-managing unit. However, during a real operation, operators record all of the steps on paper. The paper copies are then delivered to the project manager at a later date. The project manager completes the papers and makes an overall plan that is then sent to the original planner so that modifications can be made to the project's plans. This method involving multiple levels often delays the timing of revisions and results a number of errors to be made. Furthermore, both prior arts are only applicable within a single company—not between different companies or contractors. They are also provided with the same login window for every user without allowing access to different information (say for example construction plans, personnel contact details or budget information). Furthermore, both prior arts also use custom-made interfaces, thereby incurring additional costs to users.

SUMMARY OF THE INVENTION

A control method for modifying engineering information from a remote work site and a system of the same are provided. This enables, for example, engineering information to be controlled and modified in real-time through the use of digital files (such as text files, digital images, audio files and movies, etc). Through the use of these convenient forms of communication a production schedule can be shortened and costs reduced.

A control method for modifying engineering information from a remote work site and a system of the same are provided for a construction firm or a company operating in tandem with a third party.

A control method for modifying engineering information from a remote work site and a system of the same are provided for users according to their authority level.

A control method for modifying engineering information from a remote work site and a system of the same that use an Internet browser that does not have a customized design are provided.

A control method for modifying engineering information from a remote work site and a system of the same are provided for feeding issues back to a central device that allows inquiries to be made in real time from a remote work site.

A control method for modifying engineering information from a remote work site and a system of the same are provided that assist in resolving issues at a remote work site quickly, thereby saving time and money.

A control method for modifying engineering information from a remote work site and a system of the same are provided, every event thereof can be recorded.

A control method for modifying engineering information from a remote work site is provided and designed especially with engineering work in mind. When issues on a construction site or with a piece of machinery need to be solved, an image-capturing unit (such as a digital camera or a digital movie camera) can be used to record information regarding an issue. That information about the image, a location, and a construction site or a piece of machinery can then be sent via an Internet connected device to a central device. This central device relays information to at least one person responsible for that issue (on a construction project for example, this may be the project manager of a prime/primary contractor or a planner of an end/third party contractor). That person can then examine the issue. Staff at the remote work site can then be quickly informed of the most suitable course of action to take. Further inquires can also be made by staff where necessary.

A control method for modifying engineering information from a remote work site comprises: setting up a database on a network; capturing images via an image-capturing unit and uploading the images to the database via an electronic device; enabling an Internet connected module (for example, an Internet browser) inside the electronic device to communicate with an access platform via the network; providing a login page in the access platform to verify the authority level of the user; and finally creating an issue on the network database. Alternatively, a user at a remote work site can create an issue directly on the network database via a network-connected module arranged inside the electronic device without the login window. Once the user has connected to the network, an issue about the image, a location, a construction site or a piece of machinery can then be created on the database. Wherein the step of creating the issue includes: setting up location codes for a construction site or a piece of machinery, uploading an image, and storing the image on the network database. Any prior engineering information can thus be modified in accordance with the location codes and the images.

A control system for modifying engineering information from a remote work site includes: an Internet connected module (using a browser such as Microsoft Explorer or Netscape Navigator), a network-connected module, an access platform, a service platform and an image-capturing unit. The network-connected module contacts a database arranged inside the service platform directly for sending, receiving and displaying information. The Internet connected module contacts a database via the Internet for sending, receiving and displaying information via the access platform after verifying the identity of the user. The access platform communicates with the Internet connected module via an Internet browser and provides Web service in accordance with HTTP protocol. Moreover, the access platform includes an authority access module providing a login window for certifying the authority level of a user, and an option menu providing a web page next to the login window and containing corresponding information. The service platform communicates with the authority access module, and includes a plurality of optional units (menu options??) and a database connected to the optional units. In this way, the user may communicate with the authority access module and view information corresponding to their authority level. Furthermore, the optional units providing the information are accessible via the option menu. The Internet connected module and the network module are disposed in an electronic device (such as a laptop computer or a PDA), and the image-capturing unit is relative to the electronic device. Images and information can then be uploaded to the database thereby. The image-capturing unit captures images of a construction site or a piece of machinery at the remote work site. The images are then stored in the database via the access platform and a corresponding optional unit in the service platform.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, wherein:

DETAILED DESCRIPTION OF THE EMBODIMENTS

Figure 1:
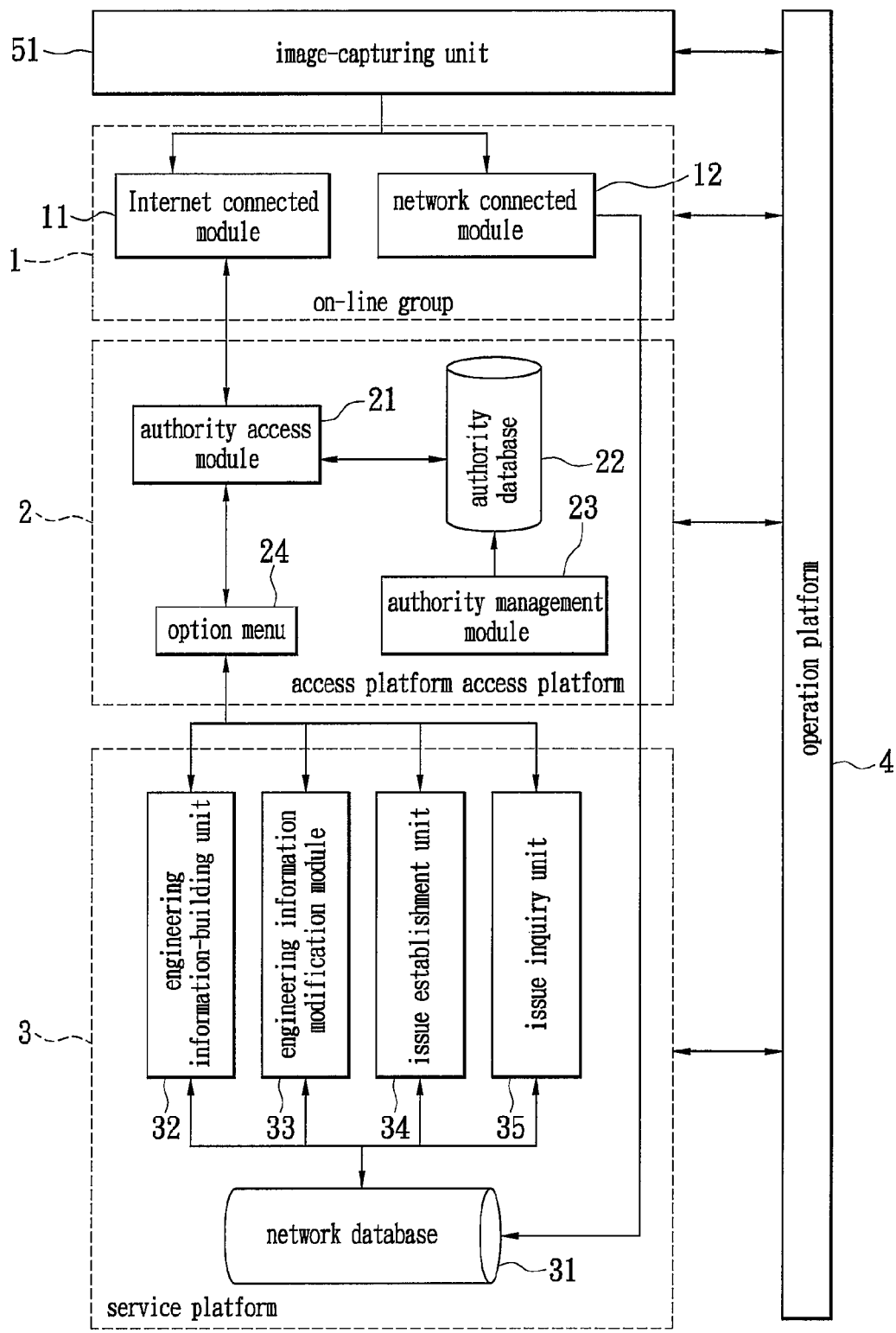
FIG. 1 is a diagram of a control system for modifying engineering information from a remote work site according to the present invention.

Referring to FIG. 1, a diagram of a control system for modifying engineering information from a remote work site according to the present invention is provided. The control system can be constructed using a 3-Tier or an N-Tier structure. The control system includes an on-line group 1 having an electronic device, an access platform 2, a service platform 3, an operation platform 4, and an image-capturing unit 51. The on-line group 1 includes an Internet connected module 11 and a network connected module 12. The Internet connected module 11 is provided for receiving data from a user, and connects the access platform 2 to the Internet in order to transmit and access information therebetween. The Internet connected module 11 further displays information from the access platform 2 on a display screen. The Internet connected module 11 is a browser that is installed on the electronic device in advance. The Internet connected module 11 connects to the access platform 2 via the network and verifies the authority level of the user via a login window. In addition, the Internet connected module 11 includes a built-in browsing program, and has a wired or wireless connection. The network connected module 12 is also used to receive data from the user, and connects with a network database 31 directly without the login window via the Internet for transmitting information. The network connected module 12 can also have a wired or wireless connection.

The access platform 2 connects to the Internet connected module 11 and provides a Web service in accordance with HTTP protocol for serving and controlling information. In this way, required information will be displayed on the Internet connected module 11 of the electronic device. The access platform 2 includes an authority access module 21 that certifies the authority level of the user, an option menu 24 communicating with the authority access module 21 and provides services corresponding to the authority level of the user, an authority database 22 connected with the authority access module 21, and an authority management module 23 for controlling and capturing the authority level of the user in the authority database 22. The authority management module 23 stores the user's access and authority information in the authority database 22 in advance. As such, the user's identity can be verified according to the authority information. The authority access module 21 verifies users in a single-sign-on manner to control who can access a network database 31. The option menu 24 of the access platform 2 meets at least the standards of JSR (Java Specification Request) 168 or WSRP (Internet services for Remote Portlets), so that the option menu 24 can provide a corresponding service in accordance to the authority information stored in the authority database 22.

The service platform 3 communicates with the option menu 24 of the access platform 2, and includes a plurality of optional units 32~35 and a network database 31 connected to the optional units 32~35. The network database 31 is used to access the optional units 32~35. Each of the optional units 32~35 are accessible depending on the authority level of the user to the corresponding option menu 24. The network database 31 of the service platform 3 includes database information or electronic documentation information (for example, engineering plans, specifications, drawings, electronic control data, location codes of equipment, planners, email addresses and phone numbers of the planners). The optional units 32~35 include an engineering information-building unit 32, an engineering information modification module 33, an issue establishment unit 34 that can create an issue regarding a construction site or a piece of machinery, and an issue inquiry unit 35. The engineering information-building unit 32 provides original engineering information stored in the network database 31 at the beginning of a project. The engineering information modification module 33 sets up engineering information that requires modification. The issue establishment unit 34 inputs engineering information that requires modification and creates issues concerning engineering information, such as construction, assembly or testing procedures. The issue inquiry unit 35 can be used to check at what stage the issue is at, meaning that the issue inquiry unit 35 can be checked to see how resolution of the issue is progressing.

The operation platform 4 is connected with the on-line group 1, the access platform 2 of the central device and the service platform 3. The operation platform 4 can be adapted for different operating systems and selected depending on the collocation of hardware among the on-line group 1, the access platform 2 and the service platform 3. The operation platform 4 provides protocol in order to (allow/enable communication between) the Internet connected module 11 the access platform 2 and to (allow/enable communication between) the network connected module 12 the network database 31.

The real-time image-capturing unit 51 connects to the Internet connected module 11 and the corresponding network connected module 12. The real-time image-capturing unit 51 provides images, including still images with additional layers of text and/or drawings on top of the still images, or movies with audio files attached. Therefore, the real-time capturing unit 51 catches images of equipment or work sites at the remote work site. The images are then stored in the network database 31 via the access platform 2 and the corresponding one of the optional units 32~35 of the service platform. Otherwise the images can be stored directly in the network database 31 via the network connected module 12.

Figure 2:
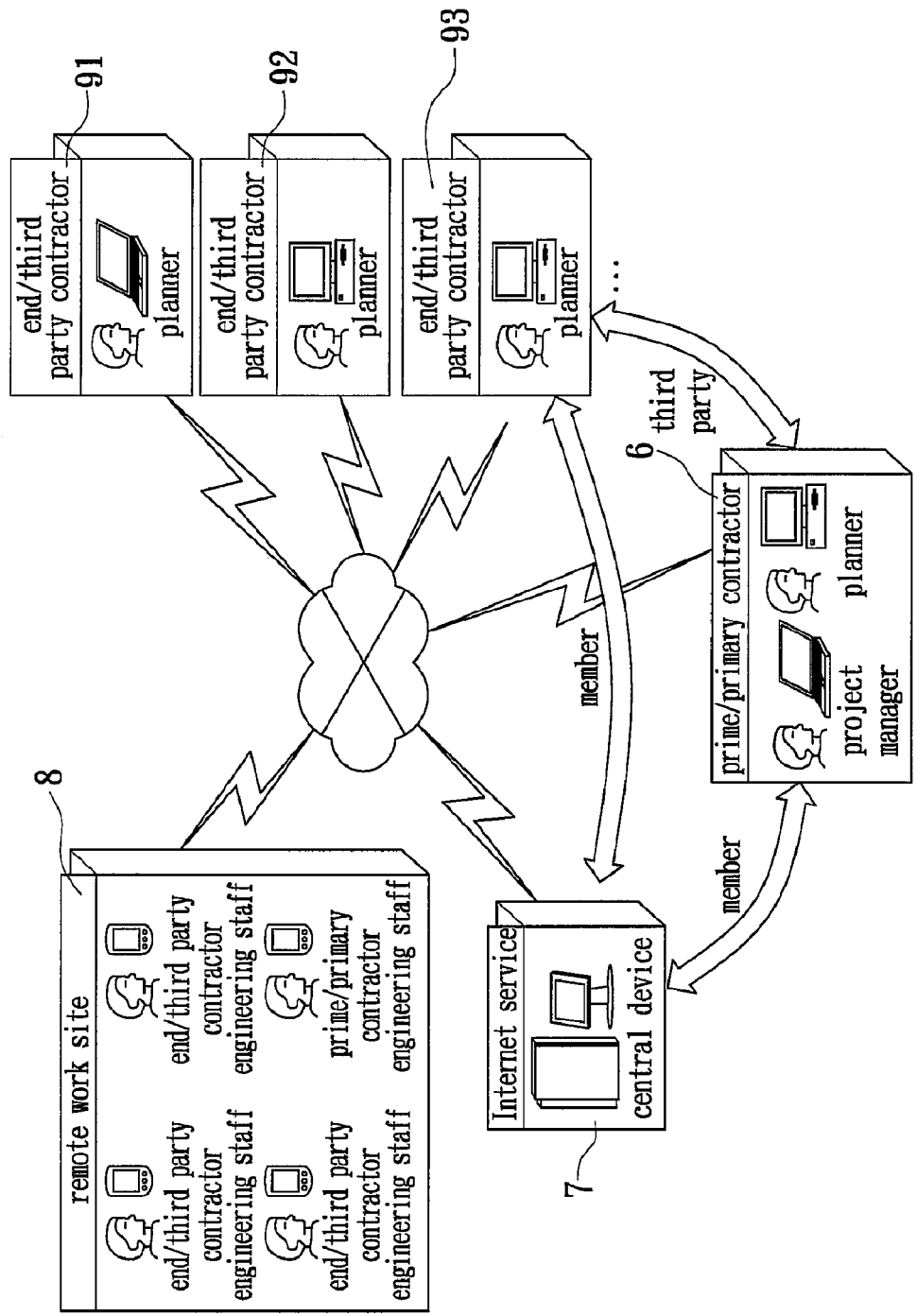
FIG. 2 is a homepage of a control method for modifying engineering information from a remote work site according to the present invention.

Referring to FIG. 2, a homepage of a control method for modifying engineering information from a remote work site according to the present invention is provided. The control method is adapted for engineering staff. When equipment or a construction site at a remote work site has an issue, an image-capturing unit 51 arranged on a portable electronic device can capture images of the equipment or the construction site. Information concerning locations and images of the equipment or the construction site can be sent to a central device 7 provided with/connected to an Internet service, and the central device 7. Alternatively, the electronic device informs at least one project manager 6 or planners 91~93 via an SMS message or an email. Next, the project manager 6 or the planners 91~93 connect to the central device 7 via an electronic device in order to view an issue about equipment or a construction site. Engineering staff 8 will be informed after the issue is resolved, and can later check to see how the resolution of the issue is progressing via the electronic device. The Internet service provider can tally in accordance with the service level (The Internet service provider can record the number of times a user accesses the central device in accordance with their service (authority) level. If the prime/primary contractor possesses/owns/operates the access platform 2, the end/third party contractors can join/access the access platform 2, and the prime/primary contractor can manage/control the end/third party contractor's access to information based upon a level of authority.

The control method for modifying engineering information from a remote work site includes:

(i) a service platform that has a database that includes information (for example, engineering plans, specifications, drawings, electronic control data, equipment codes, names and contact information) that is set up in advance;

(ii) the user at the remote work site uses an electronic device, such as a personal computer, a lap top, a cell phone or a PDA, that is connected to the Internet to access project information; thus, the user can use the electronic device to access a digital file and store the digital file in the electronic device, wherein the digital file can be a text file, a digital photograph (such as JPEG or TIFF files) or a digital movie (such as MPEG, WVA or AVI files); moreover the text file or the digital photograph can be enhanced by adding a layer with a drawing or text on top of the text file or the digital photograph, and the digital movie file can be enhanced by attaching an audio file that can be played simultaneously with the digital movie; in this way information and ideas can be transmitted easily between different parties at different locations;

(iii) the electronic device is connected to the Internet via a wired or a wireless connection, and a browser (such as Microsoft Explorer or Netscape Navigator) communicates with a access platform; the user accesses the access platform via a Internet connected module disposed in the electronic device;

(iv) a homepage of the access platform/login window is displayed on the browser, the user logs in to gain access to information stored on the database;

(v) the user's identity is verified by the log in function, the user's identity is verified by comparison with a user code and a password provided by the user with a predetermined user code and password stored in the authority database; if the user code and/or password provided by the user is incorrect, or if the user is not allowed to access any of the information stored on the database, the user is sent to a generic web page; alternatively, if the user is allowed to access information stored on the database, a corresponding web page is displayed;

(vii) the corresponding web page displays information for the user; the user may either add information (such as adding a layer with a drawing or text on top of the text file or the digital photograph, or attaching an audio file to a movie file), modify the digital files (such as updating engineering plans, specifications, drawings, electronic control data, equipment codes, names and contact information, etc), or access a help function, as they see fit; and (viii) if the user wants to log out, the connection with the Internet connected module of the electronic device should be terminated; or, if the user still wants to use the system, the connection of Internet connected module of the electronic device should be maintained and the step (vii) should be repeated later.

After step (ii) is finished, the network connected module disposed in the electronic device can connect to the Internet to communicate with the database of the central device for transmitting information.

The step of establishing an issue includes:

(a) If a problem arises on a construction site or if a piece of machinery needs to be fixed, engineering staff can take images of the equipment or the construction site via a electronic device with an image-capturing unit and store the images into the electronic media in the electronic device; engineering staff the input locations of the equipment or the construction site and memos and uploads the information, the issue establishment unit creates an issue, and transforms the locations into location codes, upload the images, and confirms the information and saves it into the database of the service platform; alternatively the network connected module can transform the locations into location codes, upload the images, and confirm these information and save them into the database directly;

(b) when the issue is created, the project manager or the planner is informed via an SMS message or an email, later the project manager or the planner is informed automatically in a regular manner via the service platform (by sending messages or emails or both); a regular manner means please.

(c) starting a determination rule to decide if the prior engineering information should be modified by the project manager or the original planner;

(d) if the prior engineering information shouldn't be modified, the project manager or the original planner sends an SMS message, an email, or both to them to inform the person who created the issue via the an engineering information modification unit; if the prior engineering information should be modified, the project manager or the original planner executes an issue inquiry unit to check the codes, confirm if the images attached to the issue conform to the prior engineering information, revising the prior engineering information according to the images, and updating the revised engineering information into the engineering information modification unit of the service platform;

(e) relevant persons are informed how to resolve the issue regarding the equipment or the construction site; and (f) to see how the resolution of the issue is progressing, the issue inquiry unit can be checked.

The advantages of the control method and system according to the present invention are:

(1) Engineering information can be controlled and changed by capturing real-time images, and as such the schedule can be shortened and costs reduced.

(2) Third parties/A construction firm, or one operating in coordination with a third party, can be provided/can easily access all information suitable to their set level of authority.

(3) Access to different information according to users' different levels of authority can be provided.

(4) A normal Internet browser can be used, therefore the added expensive of a browser with a customized design is eliminated.

(5) Issues can be fed back and checked to see how the resolution of the issue is progressing during real time, while staff work at the remote site.

(6) Problems with equipment or construction issues at a remote work site can be fixed quickly thereby saving time.

(7) Every record thereof can be recorded as history/in a history file.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A control system for modifying engineering information regarding a remote work site, comprising:
    network connected means for transmitting and accessing information via a protocol;
    Internet connected means for transmitting, accessing and displaying information via the protocol;
    an access platform communicating with the Internet connected means and providing Internet service in accordance with the HTTP protocol, wherein the access platform includes authority access means certifying an authority level of a user, and a login window communicating with the authority access means and providing services corresponding to the authority level of the user;
    a service platform for dealing with engineering information regarding the remote work site, the service platform communicating with an option menu of the access platform, and including an engineering information-building unit, an engineering information modification means, an issue establishment unit that establishes an issue, an issue inquiry unit, and a network database connected to the engineering information-building unit, the engineering information modification means, the issue establishment unit that posts the issue, and the issue inquiry unit, wherein the network database is used to access the units, and each of the means and units is accessible depending on the authority level of the user; and
    an image-capturing unit connecting to the Internet connected means;
    whereby the image-capturing unit captures images of equipment or a construction site at the remote work site to assist in resolving engineering issues that may arise as work progresses at the remote work site, and the images are then stored in the network database via the access platform and one of the units of the service platform.

2. The control system as claimed in claim 1, further including an operation platform connected with the Internet connected means, access platform and the service platform, wherein the operation platform provides the protocol in order to communicate.

3. The control system as claimed in claim 1, wherein the Internet connected means is a browser that is installed in an electronic device.

4. The control system as claimed in claim 1, wherein the Internet connected means and the network connected means have a wired or wireless connection.

5. The control system as claimed in claim 1, wherein the option menu of the access platform at least meets standards of JSR (Java Specification Request) or WSRP (Internet services for Remote Portlets).

6. The control system as claimed in claim 1, wherein the access platform further includes an authority database connected with the authority access means, and authority management means for controlling and capturing the authority level of the user in the authority database, and wherein the authority management means stores access and authority information of the user.

7. The control system as claimed in claim 1, wherein the authority access means verifies the user in a single-sign manner.

8. The control system as claimed in claim 1, wherein the engineering information-building unit is used to create an issue stored in the database at the beginning of a project.

9. The control system as claimed in claim 1, wherein the engineering information modification means is used to create an issue.

10. The control system as claimed in claim 1, wherein the issue establishment unit is used to input the engineering information that requires modification and create an issue about the engineering information.

11. The control system as claimed in claim 1, wherein the issue inquiry unit is used to check to see how resolution of the issue is progressing.

12. The control system as claimed in claim 1, wherein the network database of the service platform includes database information or electronic documentation information.

13. The control system as claimed in claim 1, wherein the network database of the service platform includes engineering plans, specifications, drawings, electronic control data, and location codes of equipment.

14. The control system as claimed in claim 1, wherein the images of the real-time capturing unit include still digital photographs with a layer of drawing or text on top of the digital photograph.

* * * * *